United States Patent
Osborn et al.

(10) Patent No.: US 6,347,545 B1
(45) Date of Patent: Feb. 19, 2002

(54) CLOSURE PRESSURE TESTING APPARATUS AND METHOD FOR TESTING CLOSURES

(75) Inventors: Kevin F. Osborn; Donald L. Stewart; Thomas J. McCandless, all of Crawfordsville, IN (US)

(73) Assignee: Alcoa Closure Systems International Inc., Crawfordsville, IN (US)

(*) Notice: Subject to any disclaimer, the term of this patent is extended or adjusted under 35 U.S.C. 154(b) by 0 days.

(21) Appl. No.: 09/587,416

(22) Filed: Jun. 1, 2000

(51) Int. Cl.[7] .............................................. G01M 3/36
(52) U.S. Cl. .............................. 73/49.2; 73/40; 73/49.8
(58) Field of Search ............................ 73/49.2, 49.8, 73/46, 40; 264/268, 40.1, 403

(56) References Cited

U.S. PATENT DOCUMENTS

| | | | | |
|---|---|---|---|---|
| 682,183 | A | * 9/1901 | Etheridge | 73/49.2 |
| 2,859,612 | A | * 11/1958 | Morse | 73/40 |
| 3,728,063 | A | * 4/1973 | Langecker | 73/49.2 |
| 4,437,353 | A | * 3/1984 | Hamerlinck | 73/863.81 |
| 4,497,765 | A | 2/1985 | Wilde et al. | 264/268 |
| 4,555,935 | A | * 12/1985 | Elert | 73/49.2 |
| 5,025,657 | A | * 6/1991 | Schenk | 73/37 |
| 5,366,774 | A | 11/1994 | Pinto et al. | 264/268 |
| 5,800,764 | A | 9/1998 | Smeyak et al. | 428/36.92 |
| 6,205,847 | B1 | * 3/2001 | Nomoto | 73/49.2 |

* cited by examiner

Primary Examiner—Hezron Williams
Assistant Examiner—Michael Cygan
(74) Attorney, Agent, or Firm—Rockey Milnamow & Katz Ltd.

(57) ABSTRACT

A bottle closure testing apparatus includes a plurality of testing modules mounted side by side on a base plate. Each testing module includes a base block having a pressure input, a pressure signal output, and a holder for a test vessel. The test vessel is a plastic bottle blow-molding preform having a bottle finish and a pressure entry port. A preform is mounted to each of the modules with the pressure entry port in fluid communication with one of the pressure inputs. A closure is screwed onto each of the preforms and the preforms are pressurized to a preselected test pressure via the module. The pressure within the preforms can be monitored by pressure gauges at the signal outputs, or by transducers at the signal outputs which communicate a pressure signal to remote monitoring equipment.

23 Claims, 4 Drawing Sheets

CLOSURE PRESSURE TESTING APPARATUS AND METHOD FOR TESTING CLOSURES

TECHNICAL FIELD OF THE INVENTION

The present invention relates to a testing apparatus, and a testing method, for pressure testing bottle closures. Particularly, the invention relates to an apparatus which utilizes a testing vessel having a bottle finish for receiving a bottle closure thereon, and having a pressurizing source and a monitoring device for determining the pressure retaining capability of the closure.

BACKGROUND OF THE INVENTION

Plastic closures are known for closing and sealing plastic bottles. Particularly, such closures are used for plastic bottles holding pressurized carbonated beverages. Such closures are described, for example, in U.S. Pat. Nos. 5,800,764 and 4,497,765.

In order to maintain the desired pressure within a carbonated beverage bottle, the associated bottle closure must seal to the bottle finish effectively, maintaining a seal even under adverse conditions. Such adverse conditions can include temperature variations, humidity variations, and external physical or mechanical forces.

To ensure quality control of manufactured bottle closures, an industry standard method of testing the pressure retaining capabilities of closures has been developed. An industry accepted method involves the pressure testing of a sample bottle that is fit with the closure to be tested. The bottle is pressurized with a pressurizing media, such as carbonated water, and a pressure reading is taken after a preselected time. The bottle is pierced with a gauge, such as with a Zahm Nagel gauge, and the pressure in the bottle is instantaneously measured.

While this method measures the pressure maintained by the closure, the method also destroys the bottle such that the test bottle and associated closure cannot be used for a subsequent pressure measurement. Accordingly, the sample size of the test is necessarily increased. The number of pressurized bottles that must be prepared is increased. The statistical accuracy of the test is limited.

As a further drawback to this test, measuring the pressure within the test bottle includes other variables such as gas permeation through the bottle, and bottle expansion under pressure that reduce the accuracy of the pressure measurement.

Another apparatus that has been used to test closures includes a bottle neck including the bottle finish, cut from a bottle and mounted on a metallic fixture. The fixture is pressurized with air and instrumented. The fixture, including the bottle finish, and the closure cap, is submerged in a water filled tank. Any escaping air from the pressurized fixture can be observed as air bubbles. This test apparatus has an advantage in measuring accuracy over the previously described apparatus in that the variables of bottle expansion and gas permeation are eliminated. However, because the bottle finish is distorted during the pressure test, the procedure requires the preparation of cut-off bottle necks for each test. The base of each bottle neck must be cut and then polished, which are labor intensive additional steps procedures.

The present inventors have recognized that it would be desirable to provide a bottle closure testing apparatus and method which overcomes the drawbacks of the prior apparatus and methods. The present inventors have recognized that it would be desirable to provide an apparatus which is easily configured for receiving closures to be tested, and which could be sufficiently portable to be used to test closures in different environments. The present inventors have recognized that it would be desirable to provide an apparatus which provides accurate test results and which can be used for testing a closure more than once and for a prolonged duration.

SUMMARY OF THE INVENTION

The present invention contemplates a testing apparatus for a closure which incorporates a pressurized, substantially cylindrical, plastic testing vessel as part of the apparatus, for receiving a closure to be tested. The plastic testing vessel can effectively be a disposable component for testing closures. The plastic testing vessel is a relatively thick-walled, tubular vessel having a bottle finish at a top end thereof and a closed bottom end. The plastic testing vessel advantageously comprises a readily available plastic bottle "preform" that exists as an intermediate stage in the blow molding of a plastic bottle.

The testing apparatus provides a base block having a pressurized media input port and a vessel holder. The vessel holder is configured to hold one of the plastic testing vessels therein. The plastic testing vessel includes a pressure entry port in sealed fluid communication with the pressurized media input port. Thus, a closure can be tightened onto the bottle finish of the plastic testing vessel and pressure tested via the pressurized media input port and the pressure entry port.

The base block can include a signal port for monitoring the pressure maintained by the plastic testing vessel and associated closure. The signal port can be monitored by a pressure gauge, or by a centralized system that includes a pressure transducer at the base block that is signal-connected to a data display and/or recorder, such as to a computer via an A/D converter.

Preferably, the base block is part of a separate test module that is mounted to an elongated base plate. Further identical test modules can also be mounted to the base plate, and thereby define a multiple closure testing apparatus. Each of the modules includes a base block having a vessel holder, and a pressurized media input port associated with the vessel holder. A plastic testing vessel having a pressure entry port is held by each of the vessel holders. Accordingly, a plurality of closures can be tested simultaneously on the base plate.

The base plate can be relatively portable to transport the closures being tested into a variety of environments, such as a cold test room, a hot test room, or a humid test room, to test the durability of the closures. The modules are configured such that the closure being tested has an overhead clearance for allowing mechanical loading of the closure for further tests.

Preferably, the vessel holder includes a slot which receives one half of the plastic testing vessel, and a clamp block which clamps the testing vessel into the slot. A nozzle member protrudes into the slot toward the clamp block, and penetrates the pressure entry port of the plastic testing vessel as the plastic testing vessel is driven into the slot by the clamp block. The nozzle member is in fluid communication with the pressure input port. An O-ring seal acts to seal around the nozzle member, and to seal around a sidewall of the plastic testing vessel.

Numerous other advantages and features of the present invention will become readily apparent from the following detailed description of the invention and the embodiments thereof, from the claims and from the accompanying drawings.

DETAILED DESCRIPTION OF THE PREFERRED EMBODIMENTS

Figure 1:
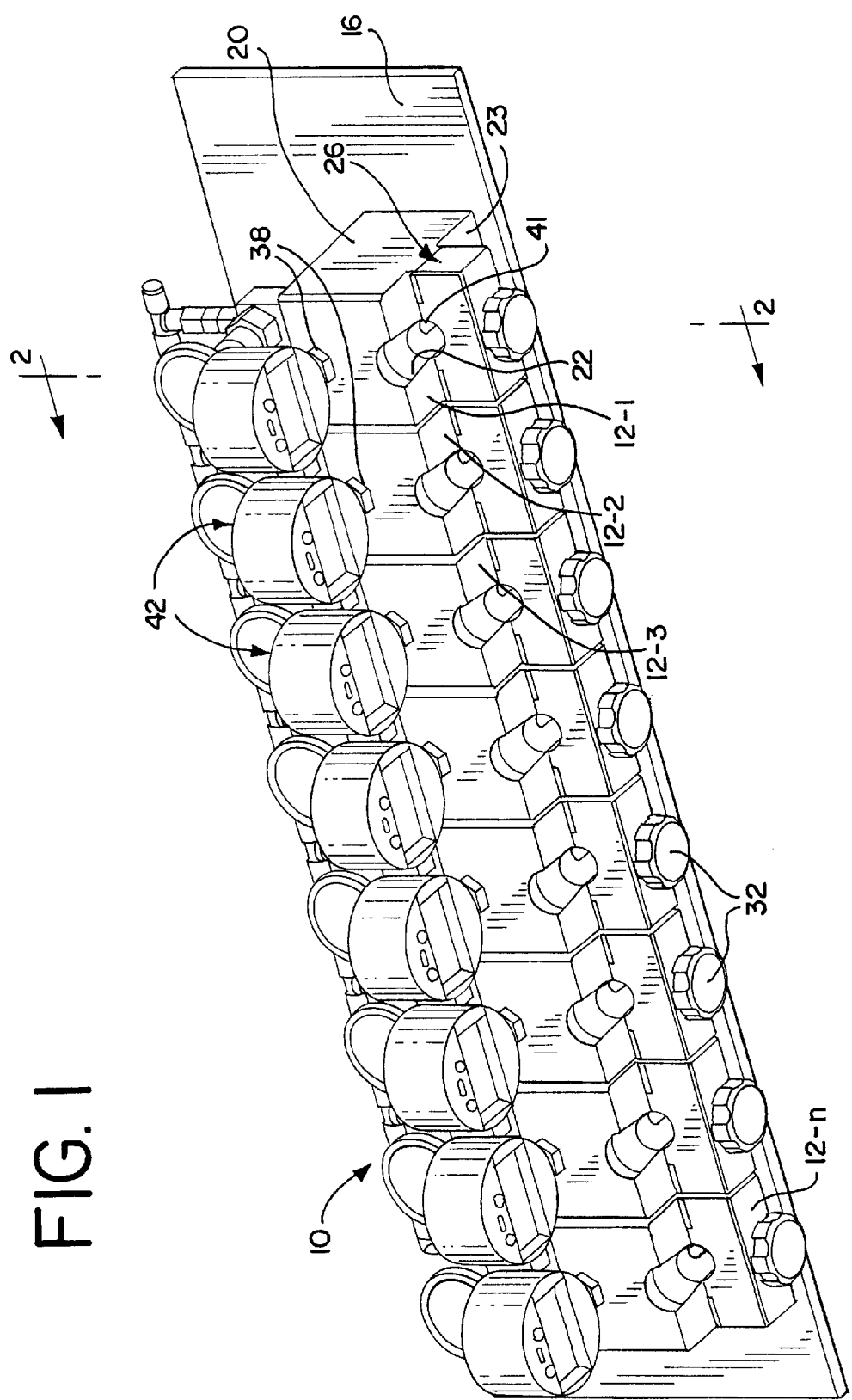
FIG. 1 is a perspective front view of a closure testing apparatus of the present invention, with plastic testing vessels removed for clarity.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

FIG. 1 illustrates a testing apparatus 10 of the present invention. The apparatus 10 includes a plurality of testing modules 12-1, 12-2, 12-3, ... 12-n, arranged on a base plate 16. In the illustrated embodiment, eight testing modules are arranged on the base plate 16. However, any number of testing modules arranged on the base plate should be considered to be encompassed by the invention.

The testing modules are essentially identical, so that the description of one of the testing modules, such as module 12-1, will suffice as a description for each of the remaining testing modules.

The testing module 12-1 includes a base block 20. A shaped slot or recess 22 is formed on a front side 23 of the base block 20. The shaped slot 22 extends substantially vertically. A clamping assembly 26 is secured to the front side 23 of the base block 20.

Figure 2:
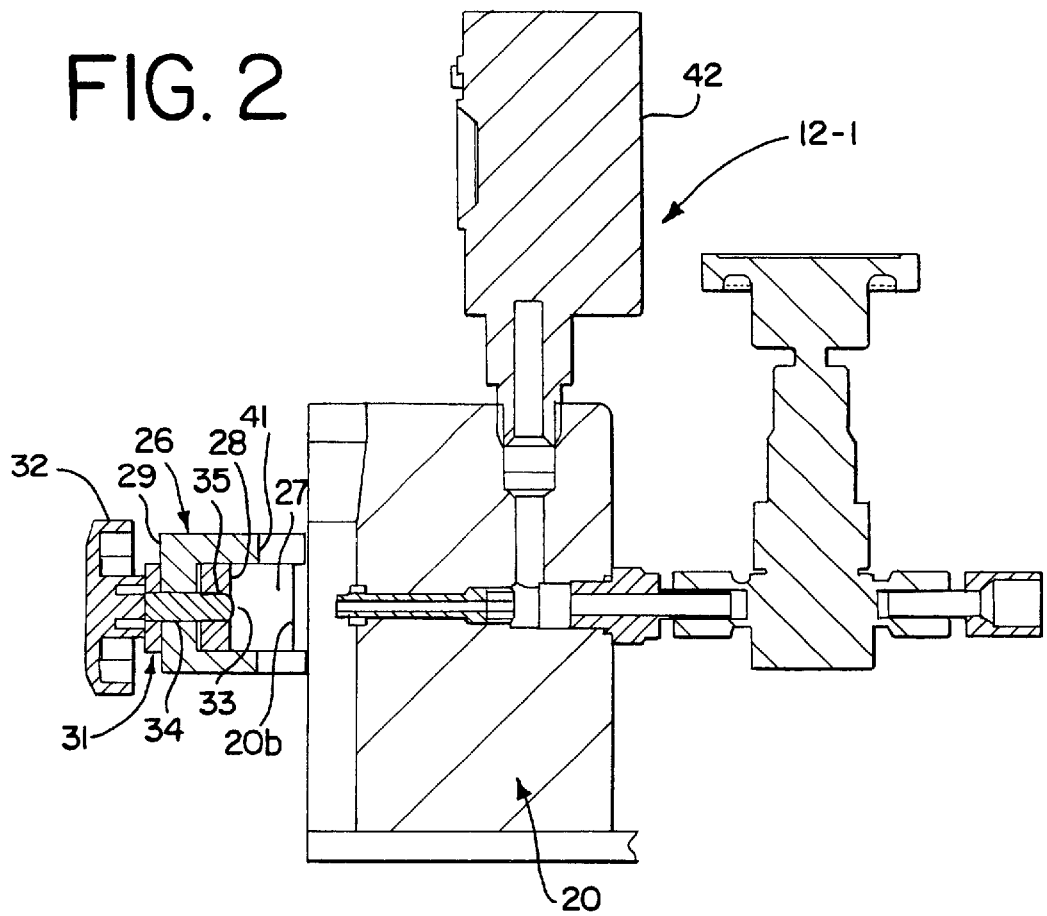
FIG. 2 is an enlarged, diagrammatic fragmentary sectional view taken generally along line 2—2 of FIG. 1, illustrating a clamp assembly.
Figure 3:
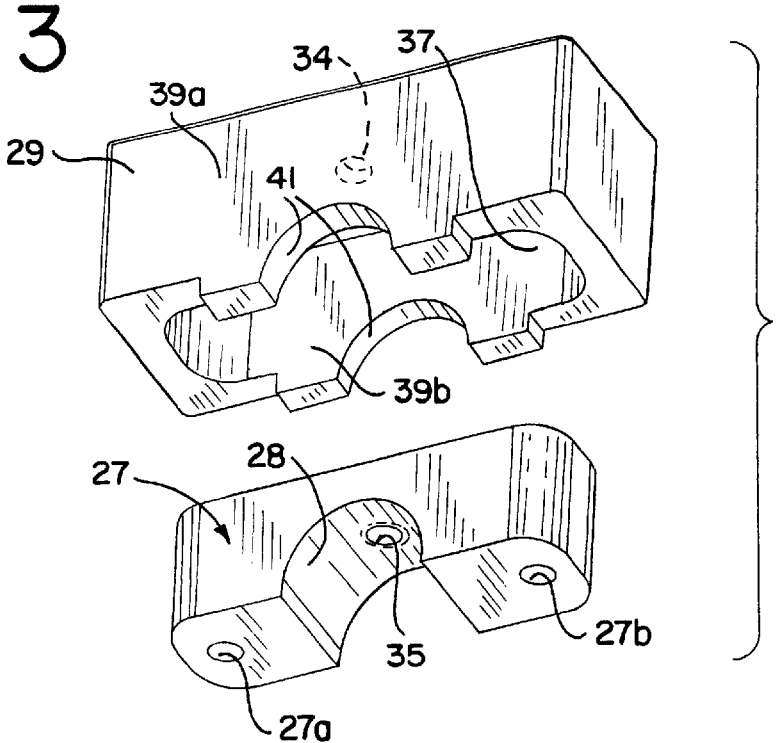
FIG. 3 is an enlarged, exploded perspective view of portions of the clamp assembly of FIG. 2.

The clamping assembly 26 is illustrated in detail in FIGS. 2 and 3. The clamping assembly 26 includes an inner clamp block 27 and an outer clamp block 29. The outer clamp block 29 carries a washer 31 and a central turning knob 32 which is turned to draw the outer clamp block 29 towards the base block 20. The turning knob 32 is connected to a threaded shaft 33 which penetrates a plain hole 34 through the outer clamp block 29, and is threaded into a threaded hole 35 through the inner clamp block 27. The inner clamp block 27 is tightly fastened to raised flat surfaces 20b of the base block 20 by two fasteners (not shown) which penetrate plain fastener holes 27a, 27b through the inner clamp block 27 and thread into threaded holes in the base block 20 (not shown). The inner clamp block 27 has a slot 28 which has a diameter sufficiently large to avoid interference with the testing vessel, once assembled. The outer clamp block 29 receives the inner clamp block 27 within a void 37 formed in the outer clamp block 29. The outer clamp block 29 includes upper and lower walls 39a, 39b that together define a bifurcated clamp slot 41. The shaped slot 22 and the clamp slot 41 together define a clearance therebetween that is slightly smaller than a diameter of the plastic testing vessel so that drawing the outer block 29 toward the base block 20 tightly clamps a testing vessel placed into the slot 22. The clamping assembly 26 and the base block 20 together form a vessel holder as will be described below.

The base block 20 includes a pressurized media inlet port 36 (shown in FIG. 4) for receiving a pressurized media, such as compressed air. The base block 20 also includes a signal port 38. A pressure gauge 42 can be mounted into the signal port 38.

Figure 4:
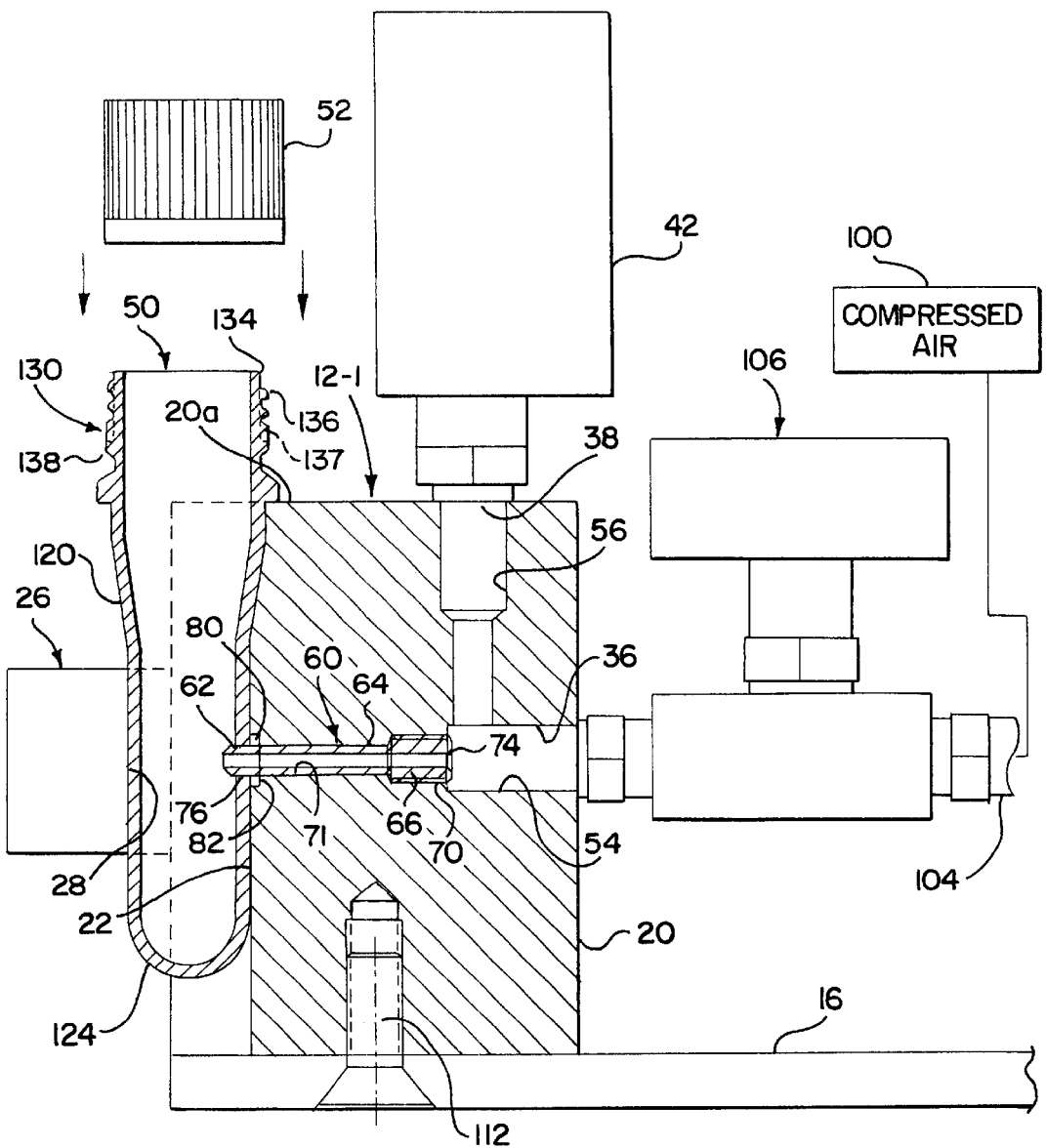
FIG. 4 is an enlarged, diagrammatic sectional view taken along line 2—2 of FIG. 1.

FIG. 4 illustrates the test module 12-1 in more detail. The module 12-1 is removably mounted to the base plate 16 by fasteners 112. The outer clamp block 29 has been drawn toward the base block 20 to clamp a plastic testing vessel 50 within the slots 22, 41. A circumferential flange 51 of the testing vessel 50 partially rests on a top surface 20a of the base block 20. The module is arranged such that a closure 52 installed on the preform has no overhead interference. Thus, the closure can easily be mechanically top loaded for specialized testing.

The pressure inlet port 36 is open into a central channel 54. A pressure signal port 38 is open into a vertical channel 56 which is connected into the central channel 54. An elongated tube 60 includes a nozzle 62, an elongated barrel 64, and a threaded end portion 66. The threaded end portion 66 is threaded into a threaded bore 70 within the base block 20. The threaded bore is open to a plain bore 71 which extends to the plastic testing vessel 50. The threaded end portion 66 includes a tool engaging end socket 74, such as a hexagon-shaped socket, for receiving a turning tool, such as an Allen wrench. Advancing the tube 60 through the plain bore 71, by turning the threaded end portion 66 in the threaded bore 70, extends the nozzle 62 to a preselected position that penetrates an opening 76 that is pre-drilled into the plastic testing vessel 50.

An O-ring seal 80 surrounds the nozzle 62 and fits within an annular groove 82 that is open into the shaped slot 22. When the nozzle is positioned to extend into the shaped slot 22, and the plastic testing vessel 50 is clamped by the clamping block 26, the nozzle 62 penetrates the opening 76. The O-ring 80 is compressed and seals between the plastic testing vessel 50 and the nozzle 62, and seals between the base block 20 and the nozzle 62.

On a rear side of the block, a source of pressurized media 100, such as compressed air, is flow connected via tubing 104 to an inlet valve 106. The inlet valve 106 is flow connected to the input port 36. Threaded tubing connections can be used to connect the components.

The plastic testing vessel 50 is preferably a blow-molding preform of a PET plastic bottle that is configured, for example, as described in U.S. Pat. No. 5,366,774, herein incorporated by reference. The preform is typically an injection molded part having a relatively thick cylindrical body 120 with a round, closed end 124. The wall thickness of a preform is typically 0.150 or ⅛ inch. The preform is typically 4 inches in length. Opposite to the closed end is a bottle finish 130. The bottle finish 130 includes sealing surfaces 134, threads 136, venting slots 137 and a step 138 for a tamper-indicating element.

The apparatus 10 is suitably configured for testing one, or a plurality of closures by screwing each of the closures onto a respective finish 130 of testing vessels 50 mounted on modules. The preform 50 and the associated closure 52 are then subjected to a preselected pressure by introducing a pressurizing media through the inlet valve 106, through the inlet port 36, through the channel 54, through the tube 60 and into the preform 50. After the pressure test is reached, the inlet valve is closed and the pressurized media is held in the preform. The module 12-1 is monitored for pressure retention, i.e., pressure drop over an observed time interval. The monitoring can be accomplished by observation of the pressure gauge 42 or by a data display and/or data recorder separated by distance from the module 12-1 as described below.

The apparatus 10 is sized to be portable such that a plurality of testing vessels and closures can be pressurized and then the apparatus can be placed in an adverse environment for testing, such as a cold room, a hot room, a humid room, etc. Additionally, the closures can be subjected to mechanical loads, such as simulating the loading on a bottle closure due to a stacking of bottles in storage.

The use of a preform as an assembled part of the testing apparatus offers many advantages over the prior testing apparatus. The relatively thicker walls of the preform will have substantially less gas permeation than the relatively thin walls of a finished bottle as test vessel. This increases the measuring accuracy of the pressure test by eliminating a source of gas egress.

The thicker walls of the preform will cause less vessel volume expansion during the pressure test than would occur with a finished bottle as test vessel. This will also increase the measuring accuracy by eliminating a source of pressure drop (due to increased vessel volume).

The apparatus of the invention is more responsive than the prior testing apparatus that used a finished bottle as a test vessel. The volume of the preform is substantially less than the volume of a finished bottle. Due to the smaller volume, testing time for a closure is reduced because, given a leak, the pressure will drop faster in a smaller volume.

The testing method of the present invention is non-destructive, and numerous measurements can be made on a single sample. This decreases labor and time by decreasing the sample size and decreasing the total number of samples needed. This also increases the statistical power of the test.

The testing apparatus has an improved versatility in that preforms can be made with various finish dimensions corresponding to the bottle finish variations experienced in the field. Bottle finishes can be manufactured according to a minimum and a maximum size within given manufacturing tolerances, and used in the testing apparatus.

The illustrated testing apparatus of the invention includes eight modules. The testing apparatus is small and portable. The apparatus can easily be moved into different environments (cold test room, hot test room, high humidity test room, etc.) in the course of performing tests.

Figure 5:
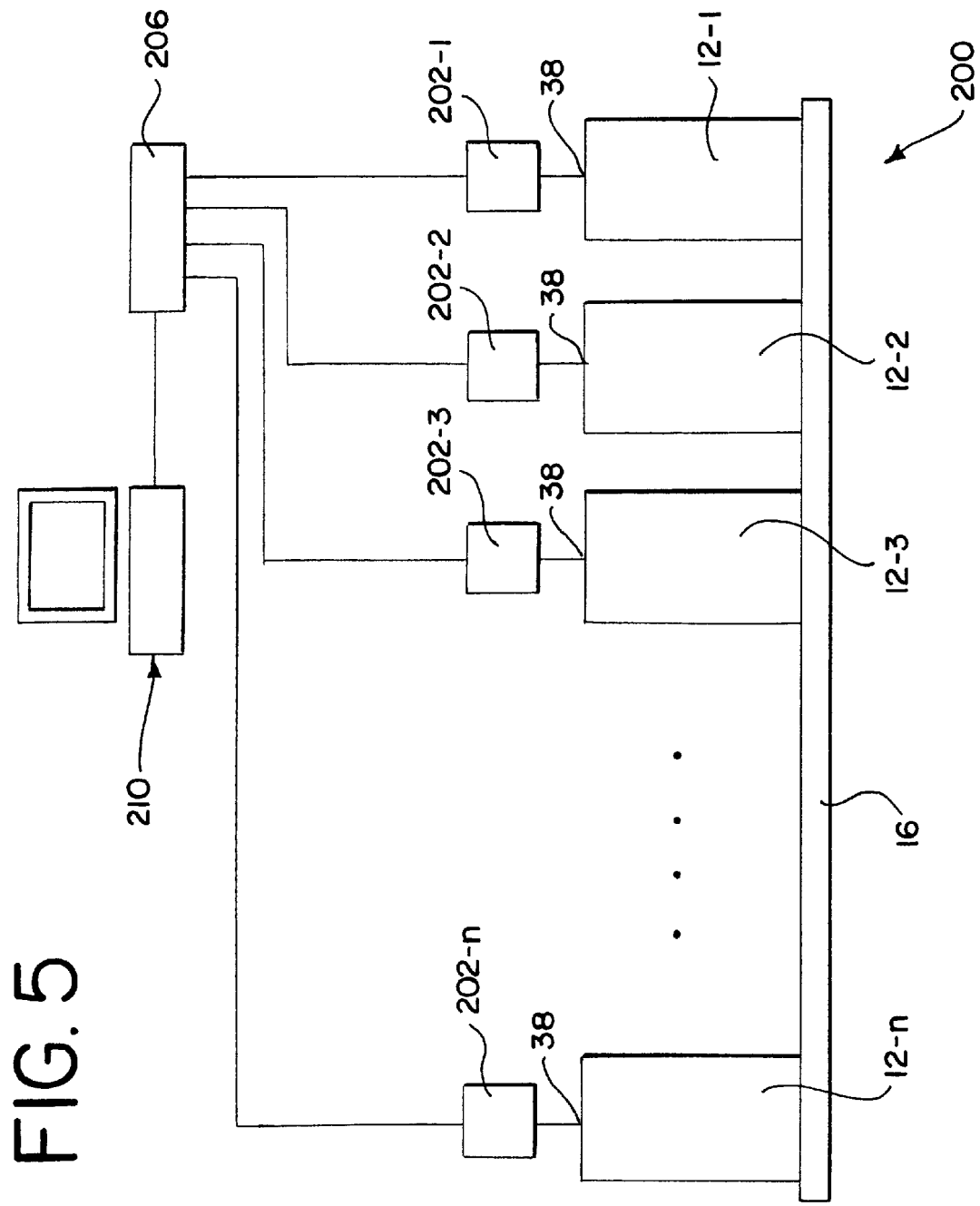
FIG. 5 is a schematic diagram of an alternate embodiment testing apparatus of the invention.

FIG. 5 illustrates an alternate embodiment apparatus 200, wherein the testing modules 12-1, 12-2, 12-3, . . . 12-n are each connected to a respective pressure transducer 202-1, 202-2, 202-3, . . . 202-n at the respective signal ports. The transducers are signal-connected to an analog-to-digital converter 206 which is signal-connected to a personal computer 210 for displaying the pressures associated with each transducer 202-1, 202-2, 202-3, . . . 202-n. The pressure output by each transducers can be graphed or otherwise displayed over time by the personal computer.

It is anticipated that the preforms will be used once and discarded. In that respect, the preforms will function as disposable testing components for closure testing. The vessel holders are quickly opened and closed to accommodate preform change out.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. A bottle closure testing apparatus, comprising:
   a module having an input port and a holder; and
   a testing vessel held by said holder and having a generally tubular body and a bottle finish, said body having a pressure entry port in pressure communication with said input port, said testing vessel comprising a blow-molding pre-form for a plastic bottle.

2. The testing apparatus according to claim 1, further comprising a pressure monitoring device, and wherein said module further comprises a signal port in pressure communication with said input port, said signal port being signal-connected to said pressure monitoring device.

3. The testing apparatus according to claim 1, wherein said module comprises a base block having a bore between said input port and said pressure entry port of said testing vessel.

4. The testing apparatus according to claim 3, wherein said base block includes a nozzle in pressure communication with said bore, said nozzle extending into said pressure entry port, said nozzle sealed to said testing vessel.

5. The testing apparatus according to claim 4, comprising an O-ring seal surrounding said nozzle and sealingly pressed to an outer surface of said testing vessel.

6. The testing apparatus according to claim 5, wherein said base block comprises a slot having an open face on one side for receiving a portion of the testing vessel, and a clamp, said clamp overlying a portion of said open face and progressively movable toward said base block to clamp said testing vessel to said base block within said slot.

7. The testing apparatus according to claim 6, wherein said nozzle protrudes into said slot, and clamping of said testing vessel places said nozzle into said entry port.

8. The testing apparatus according to claim 2, wherein said pressure monitoring device comprises a pneumatic pressure gauge.

9. The testing apparatus according to claim 2, wherein said pressure monitoring device comprises a pressure transducer, and a remote display that is signal-connected to the display.

10. The testing apparatus according to claim 1, wherein said module is one of a plurality of identically configured modules, and said testing vessel is one of a plurality of testing vessels, one testing vessel held by each module, and further comprising a base plate, wherein said plurality of modules are mounted on said base plate.

11. The testing apparatus according to claim 10, wherein each of said modules further comprises a pressure monitoring device, and wherein each of said modules further comprises a signal port in pressure communication with said pressure input port, said pressure output port being signal-connected to said pressure monitoring device.

12. The testing apparatus according to claim 1, wherein said vessel has a substantially constant diameter over its length, said diameter approximately equal to a diameter of a closure to be tested.

13. The testing apparatus according to claim 1, wherein said holder comprises a clamp.

14. A method of testing a plurality of bottle closures, comprising the steps of:
   providing a plurality of plastic bottle blow-molding preforms, each preform having a tubular body and a bottle finish;
   arranging the preforms on a common base plate;
   screwing on a bottle closure to each of the preforms;
   pressurizing each of the preforms to a preselected pressure;

monitoring the pressure within each of the preforms for a preselected time.

15. The method according to claim 14, comprising the further steps of relocating the common base plate and said plurality of preforms into an adverse environment while pressurized, and monitoring the pressure within said preforms over a preselected time interval.

16. The method according to claim 15, wherein said adverse environment is one selected from the group of elevated temperature, elevated humidity, and external mechanical loads.

17. A testing apparatus for bottle closures, comprising:

a base assembly having a plurality of preform holders and a plurality of input ports, each input port associated with one preform holder;

a plurality of preforms, one preform held in each preform holder, each preform having an exposed bottle finish to receive a closure to be tested, each preform having a pressure entry port in pressure communication with one input port.

18. The testing apparatus according to claim 17, further comprising a plurality of signal ports, each signal port being in pressure communication with one of said input ports.

19. The testing apparatus according to claim 18, comprising a plurality of pressure gauges, one pressure gauge fit into each of said signal ports.

20. The testing apparatus according to claim 17, wherein said base assembly is sized to be carried by a user.

21. A bottle closure testing apparatus, comprising:

a base plate;

a plurality of testing modules, each testing module mounted to said base plate, each testing module comprising a preform holder, an input port, and a signal port;

a plurality of preforms, each preform having a generally tubular body closed at one end and having a bottle finish at a respective opposite end, each preform having a pressure entry port through said tubular body, each preform mounted to one of said testing modules in a respective preform holder, each of said pressure entry ports being in pressure communication with a respective input port of said respective testing module; and a plurality of pressure instruments, each mounted to one of said signal ports, and a plurality of displays, associated respectively with said pressure instruments.

22. The testing apparatus according to claim 21, wherein said plurality of displays comprise pressure gauges, one pressure gauge located at each of said signal ports.

23. The testing apparatus according to claim 21, wherein said plurality of displays comprise output indicia on a computer monitor.

* * * * *